2 Sheets--Sheet 1.
O. P. DRAKE.
Improvement in Carbureters.
No. 131,814.              Patented Oct. 1, 1872.
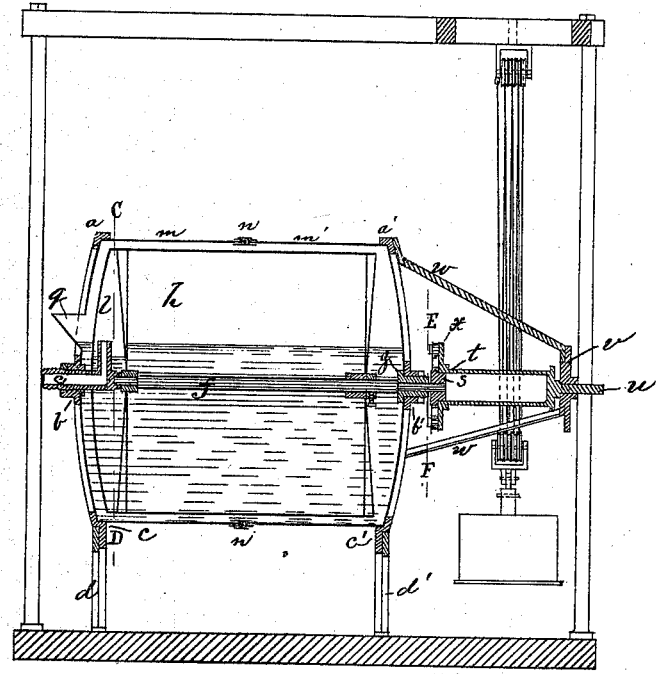
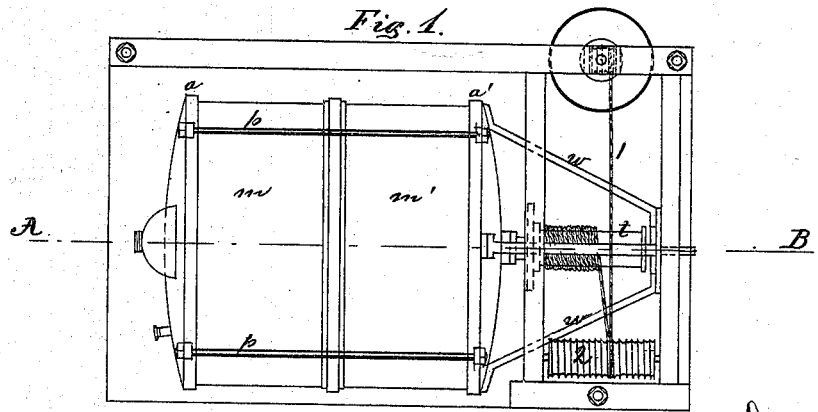
Witnesses:
George E. Phelps.
E. E. Torrey
Inventor:
Oliver P. Drake.
by Away Andrew, his attorney.

2 Sheets--Sheet 2.
O. P. DRAKE.
Improvement in Carbureters.
No. 131,814.  Patented Oct. 1, 1872.
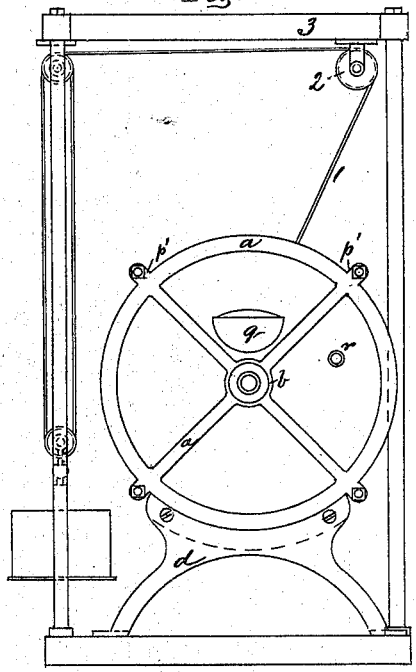
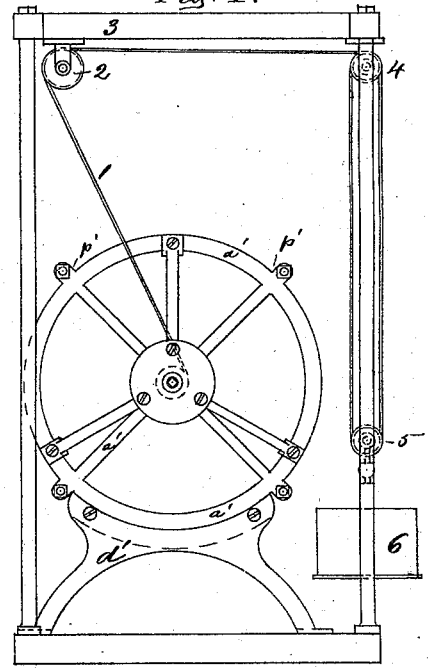
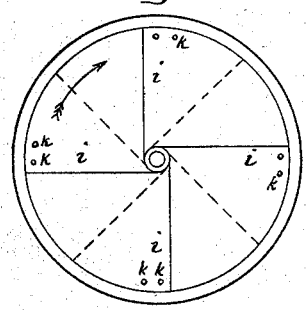
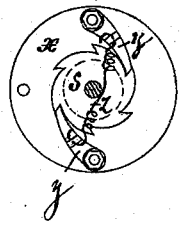
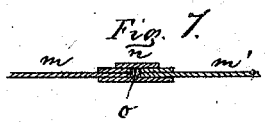
Witnesses:
George E. Phelps.
E. C. Torrey
Inventor:
Oliver P. Drake.
by Alban Andrèn, his attorney

UNITED STATES PATENT OFFICE.

OLIVER P. DRAKE, OF BOSTON, MASSACHUSETTS.

IMPROVEMENT IN CARBURETERS.

Specification forming part of Letters Patent No. 131,814, dated October 1, 1872.

*To all whom it may concern:*

Be it known that I, OLIVER P. DRAKE, of Boston, in the county of Suffolk and State of Massachusetts, have invented certain new and useful Improvements on Air-Forcing Apparatus for the Manufacture of Illuminating Gas, and other purposes, of which the following is a specification:

Nature and Objects of the Invention.

The nature of my invention relates to improvements on rotary air-forcing apparatus for the manufacture of illuminating gas and other purposes, consisting in the employment of a rotating drum provided with spiral-formed chambers, the exhaust-disks of which have perforations near the edges for the purpose of regulating the even flow of the forced air. The said drum rotates in a circular chamber or receiver filled partially with water or suitable liquid. Also, in the arrangement of a winding drum made to move loosely over the end of the pump-shaft and provided with suitable pawls operating a ratchet-wheel attached to the pump-shaft. A rope is attached to the said drum and guided over a spirally-grooved drum to a pair of blocks provided with a number of pulleys. A suitable weight is hung to the lower block and constitutes the driving power for the operation of the pump. Also, in the arrangement and construction of skeleton frames having detachable supports. The case or receiver for the liquid is parted between the skeleton frames, and one of the parts is provided with a suitable groove in which an elastic packing-ring is laid. The other part of the receiver projects in the said groove and rests on the elastic packing-ring, whereby the receiver is made perfectly tight. The skeleton frames are held in place by rods projecting through ears on the frames. The rods are provided with nuts on their extreme ends, whereby the frames and receiver are screwed together and held firmly in place.

On the drawing, Figure 1 represents a ground plan; Fig. 2 represents a central longitudinal section over the line A B taken on Fig. 1; Fig. 3 represents an end view seen from A on Fig. 1; Fig. 4 represents an end view seen from B on Fig. 1; Fig. 5 shows a cross-section on the line C D taken on Fig. 2; Fig. 6 is an enlarged cross-section over the line E F taken on Fig. 2; and Fig. 7 is an enlarged section of the joint on the receiver.

Similar letters refer to similar parts wherever they occur on the drawing.

The object of this my invention is to dispense with a regulating apparatus that is generally used in connection with air-forcing apparatus of this kind, and for the above-named purposes.

$a\ a'$ on the drawing are the skeleton frames, provided with hubs $b\ b'$, as shown. On the under side of each skeleton frame $a\ a'$ is cast a flange, $c\ c'$, bolted to the supports $d\ d'$ by suitable bolts or screws, as shown. By this arrangement of having the supports $d\ d'$ detachable from the frames $a\ a'$ I am able to perform the engine-work to better advantage; also to pack for shipment in a smaller case and safer manner than if the supports were permanently attached thereto. Through the hub $b$ projects an elbow-pipe, $e$, through which the air is forced from the air-pump. The inner end of the pipe $e$ serves as a bearing for the pump-shaft $f$. A suitable stuffing-box bearing, $g$, projects through the hub $b'$ and serves as a second bearing for the said shaft $f$. To the shaft $f$ is attached the circular drum $h$, provided with disks $i\ i\ i\ i$, shown in Fig. 5, overlapping each other and otherwise constructed in the same manner as ordinary wet-meters are constructed, with the exception that I perforate the delivery-disks $i\ i\ i\ i$ with holes $k\ k$ of any suitable shape, near the edges of the said delivery-disks $i\ i\ i\ i$. The object of these perforations is to let in the air from the chamber $l$ gradually into the chamber opposite, so as to equalize the pressure, instead of permitting the air to rush in through the whole width of the outlet-orifice of the disks $i\ i\ i\ i$ as soon as the said disks are moved out of the liquid in which the drum $h$ is partially immersed. By the arrangement of the small inlet-holes $k\ k$, I dispense entirely with any regulating apparatus that is usually connected with air-forcing apparatus of this kind for the purpose of regulating the air that is forced. The small perforations $k\ k$ made near the edges of the disks $i\ i\ i\ i$ answer all the purposes for a regulating apparatus, as so little air is gradually let in through them till the pressure is the same on both sides of the disks $i\ i\ i\ i$, by which the air is at all times forced very gently and evenly to the gas or other machine for which the pump is to be used. To the delivery-end of the drum $h$ is attached an air-chamber, $l$, into which the air is forced and delivered from the disk-orifices $i\ i\ i\ i$. The upper end of the elbow-pipe $e$ projects in the air-chamber $l$ a little above the surface of the liquid, as shown on Fig. 2, so that the air that is forced into the air-chamber $l$ may have a free exit through the said elbow-pipe $e$. The drum $h$ revolves in a case or receiver, $m\ m'$, made of sheet-brass, the ends of which rest loosely in the skeleton-frames $a$ $a'$. The receiver is made in two parts, $m\ m'$, and joined together at $n$, as shown in Figs. 2 and 7. This water and air tight joint $n$ consists of an annular groove made on the part $m,$' in which an elastic packing-ring, $o$, (Fig. 7,) is laid. The part $m'$ projects in the annular groove on the part $m$, and rests against the elastic packing-ring $o$. The frames $a\ a'$, as well as the case $m\ m'$, are firmly held together by means of the screw-bolts $p\ p$ projecting through the ears $p'\ p'$ attached to the frames $a\ a'$, and the nuts screwed over the ends of the bolts $p$ $p$, as fully shown on the drawing. The forward end of the case $m$ is provided with an opening, $q$, through which the case may easily be filled with the liquid that is used in the receiver. A vent-hole, $r$, is also made in the same end, whereby the height of the liquid in the receiver may be known and adjusted. On the extreme rear end of the shaft $g$ is keyed a ratchet-wheel, $s$, (Figs. 2 and 6,) provided on its outer end with a circular hub, over which the barrel $t$ is made to move loosely when the rope is wound on the said barrel. The rear end $u$ of the barrel $t$ is supported at the center of the disk $v$. The disk $v$ is attached to the skeleton-frame $a'$ by means of the braces $w\ w\ w$, shown in Figs. 1, 2, and 4. The barrel $t$ is provided with a flange, $x$, (Fig. 6,) to which is affixed a pair of pawls, $y\ y$, held in contact with the ratchet-wheel $s$ by means of the coiled spring $z$ attached to the pawls $y\ y$, as fully shown in Fig. 6, by which arrangement the rope may be wound on the barrel $t$ without turning the shaft $f$ and cylinder $h$; but when the rope is unwound from the barrel $t$ the pawls $y\ y$ catch hold on the ratchet $s$, when the shaft $f$ and cylinder $h$ must move with the said barrel $t$. The rope 1 is attached to a suitable place on the barrel $t$, and guided onto the barrel over a spirally-grooved pulley, 2, that is free to move in suitable bearings attached to the frame 3, or its equivalent. The pitch of the spiral cut on the face of the pulley 2 is of about the size of the thickness of the rope that is used, so that the rope shall be evenly and spirally guided on the barrel $t$ when it is wound on it or unwound, as the case may be. The rope 1 is carried from the spiral drum 2 to a pair of multiplied blocks, 4 5, containing each a number of grooved pulleys, as shown, by which arrangement I dispense with the gearings commonly used on similar machines. The upper block 4 is hung and attached to the frame 3, and to the lower block 5 is attached a suitable weight, 6, that constitutes the motive power for the air-forcing apparatus.

Having thus fully described the nature, construction, and operation of my invention, I wish to secure by Letters Patent and claim—

1. The apertures $k\ k$, of any suitable form and shape, one or more, near the delivery-edges of the exhaust-disks on rotary air-forcing apparatus, for the purpose of regulating the even flow of the air or gas, as herein fully shown and described.

2. In combination with the barrel $t$ and the blocks 4 5, with its weight 6, of the spirally-grooved guiding-pulley 2, as and for the purpose set forth.

3. The construction and arrangement of the sheet-metal casings $m\ m'$, resting in the recessed skeleton frames $a\ a$, provided with a packing at $n$, and held together by means of the longitudinal screw-bolts $p\ p\ p\ p$ going through ears on the frames $a\ a$, in a manner and for the purpose as herein set forth and described.

OLIVER P. DRAKE.

Witnesses:
ALBAN ANDRÉN,
GEORGE E. PHELPS.